United States Patent
Yanagisawa et al.

(10) Patent No.: US 9,922,738 B2
(45) Date of Patent: Mar. 20, 2018

(54) TRAVELING REACTOR POWER MONITORING SYSTEM AND METHOD FOR MONITORING DRIVING TORQUE

(71) Applicant: KABUSHIKI KAISHA TOSHIBA, Minato-ku (JP)

(72) Inventors: Masataka Yanagisawa, Tokyo (JP); Toshifumi Sato, Tokyo (JP); Tadashi Miyazaki, Kanagawa-ken (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 1004 days.

(21) Appl. No.: 13/800,303

(22) Filed: Mar. 13, 2013

(65) Prior Publication Data
US 2013/0266110 A1   Oct. 10, 2013

(30) Foreign Application Priority Data
Mar. 15, 2012 (JP) .................................. 2012-059476

(51) Int. Cl.
G21C 17/108   (2006.01)
G21C 17/10    (2006.01)

(52) U.S. Cl.
CPC ............ *G21C 17/108* (2013.01); *G21C 17/10* (2013.01)

(58) Field of Classification Search
CPC ........ G21C 17/00; G21C 17/08; G21C 17/10; G21C 17/104; G21C 17/108; G21C 19/00; G21C 23/00; G21D 3/10; G21G 1/02
USPC ..................... 376/245, 254, 258; 250/370.05
See application file for complete search history.

(56) References Cited

U.S. PATENT DOCUMENTS

| | | | | |
|---|---|---|---|---|
| 4,624,400 A | * | 11/1986 | Zimmer ................ | B65H 51/12 165/11.1 |
| 5,096,658 A | * | 3/1992 | Lunz .................... | G21C 17/108 376/245 |
| 5,773,945 A | * | 6/1998 | Kim ....................... | H02H 7/085 318/434 |
| 6,107,926 A | * | 8/2000 | Kifuku ................. | B62D 5/0487 318/432 |

(Continued)

FOREIGN PATENT DOCUMENTS

| | | |
|---|---|---|
| JP | 63-235897 A | 9/1988 |
| JP | 2-66495 | 3/1990 |

(Continued)

OTHER PUBLICATIONS

Sumitomo Drive Technologies "Torque Limiter Equipped Cyclo® Speed Reducers and Gearmotors." Availabel at http://www.sumitomodrive.com/uploads/product/files/file-38.pdf.*

(Continued)

*Primary Examiner* — Sharon M Davis
(74) *Attorney, Agent, or Firm* — Oblon, McClelland, Maier & Neustadt, L.L.P.

(57) ABSTRACT

A traveling reactor power monitoring system includes a drive control unit configured to drive a motor and move a traveling probe in a guide tube by driving the motor, a torque sensor configured to measure a drive torque of the motor, and a drive torque monitoring unit that generates an alarm when the measured drive torque exceeds a predefined upper threshold, and that bypasses generating the alarm for a predefined bypass time, the predefined bypass time starting at a time of starting driving the motor.

4 Claims, 6 Drawing Sheets

(56) References Cited

U.S. PATENT DOCUMENTS

| | | | | |
|---|---|---|---|---|
| 6,430,247 B1* | 8/2002 | Mourlevat | ............ | G21C 17/10 376/254 |
| 6,943,509 B2* | 9/2005 | Schneider | ................ | B04B 9/10 318/268 |
| 2002/0144968 A1* | 10/2002 | Ruddy | .................... | B66D 1/46 212/278 |
| 2007/0274427 A1* | 11/2007 | Jullien | .................... | B66D 1/58 376/268 |
| 2012/0001012 A1* | 1/2012 | Yasuta | .................. | G21C 17/10 242/563 |

FOREIGN PATENT DOCUMENTS

| | | |
|---|---|---|
| JP | 3-12196 U | 2/1991 |
| JP | 8-54300 | 2/1996 |
| JP | 2002-71483 A | 3/2002 |
| JP | 2004-77126 | 3/2004 |
| JP | 2006-145417 | 6/2006 |
| JP | 4115772 B2 | 7/2008 |
| JP | 2010-202391 | 9/2010 |

OTHER PUBLICATIONS

Omron "Technical Guide for Motor Protective Relays." Available at https://www.ia.omron.com/support/guide/65/overview.html.*
Machine Translation of JP 2002-071483A.*
Understanding D.C. Motor Characteristics, http://lancet.mit.edu/motors/motors3.html, accessed Jul. 6, 2017.*
Transient Behaviour—Current Surges (Motors and Drives), http://what-when-how.com/motors-and-drives/transient-behaviour-current-surges-motors-and drives/, accessed Jul. 6, 2017.*
Office Action dated Jan. 16, 2015 in Japanese Application No. 2012-059476 (submitting English translation only).
Notice of Reasons for Refusal dated Jun. 27, 2014 in Japanese Patent Application No. 2012-059476 (with English translation).

* cited by examiner

TRAVELING REACTOR POWER MONITORING SYSTEM AND METHOD FOR MONITORING DRIVING TORQUE

CROSS-REFERENCE TO RELATED APPLICATION

This application is based upon and claims the benefit of priority from Japanese Patent Application No. 2012-059476, filed on Mar. 15, 2012, the entire content of which is incorporated herein by reference.

FIELD

The present disclosure relates to a traveling reactor power monitoring system that moves a traveling probe in a nuclear reactor by feeding and spooling a probe cable in the reactor. More particularly, the disclosure is directed to a traveling reactor power monitoring system that monitors the drive torque appropriately.

BACKGROUND

At a Boiled Water Reactor (BWR) power plant, to measure neutron flux in a nuclear reactor, Local Power Range Monitors (LPRMs) are provided in the reactor. Fissile material provided at an electrode in the LPRMs fissions and releases ionized atoms as a result of being irradiated with neutrons. Neutron flux is obtained by measuring the ionized atoms.

However, the LPRMs are placed in the reactor constantly and are difficult to replace, and the sensitivity of the LPRMs declines with time because of consumption of the fissile material. Therefore, the sensitivity of the LPRMs needs to be calibrated at different times to measure neutron flux in the reactor precisely.

At a Pressurized Water Reactor (PWR) power plant, to measure neutron flux in a nuclear reactor, fixed neutron sensors are provided at the outer periphery of the reactor. But the sensitivity of these fixed neutron sensors also declines with time and needs to be calibrated at different times.

To calibrate the sensitivity of the LPRMs of the BWR and fixed neutron sensors of the PWR, a traveling reactor power monitoring system is provided in the nuclear power plant. Generally, the traveling reactor power monitoring system in the BWR is referred to as a Traversing In-core Probe (TIP) monitoring system.

This TIP monitoring system moves a traveling probe, referred to as a TIP, in guide tubes provided in the reactor, and the TIP measures neutron flux in the proximity of the LPRMs while moving. By using measured neutron flux, the sensitivity of the LPRMs is calibrated.

At a PWR power plant, the traveling reactor power monitoring system referred to as a Flux Mapping System moves a traveling probe (TIP) in the reactor, and the sensitivity of the fixed neutron sensors is calibrated by using measured neutron flux or gamma rays measured by the traveling probe.

The traveling probe is attached to an edge of a probe cable, and the traveling probe moves in the guide tubes by feeding the probe cable from a storage reel and spooling the probe cable onto the storage reel by rotating a motor. This traveling probe measures radioactivity such as neutrons and gamma rays as the reactor power during moving in the reactor core.

At this point, to reduce friction while the traveling probe and the probe cable move in the guide tube, the inside of the guide tubes can be coated with a lubricant.

When the drive torque that is a torque necessary for moving the traveling probe and the probe cable exceeds an appropriate value, there is a possibility of damaging the guide tube, the traveling probe, and the probe cable by excessive friction. Therefore, the friction inside of the guide tubes can be monitored by measuring the drive torque.

Japanese Patent Laid-open Publication No. 2002-71483 discloses a traveling reactor power monitoring system having a torque sensor attached to the motor shaft. That torque sensor measures the drive torque automatically.

The above mentioned traveling reactor power monitoring system compares the drive torque and a predefined upper threshold during the neutron measuring operation, and generates an alarm when the drive torque exceeds the upper threshold.

However, due to an inrush current or static frictional force, the drive torque at a time of starting driving the motor may be larger than the drive torque at driving the motor. As a result, despite an acceptable friction condition, the existing traveling reactor power monitoring system may generate an alarm when the drive torque at a time of starting driving the motor exceeds the upper threshold.

SUMMARY

Accordingly, an aspect of the disclosed embodiments provides a traveling reactor power monitoring system that monitors drive torque appropriately.

In accordance with the disclosed embodiments, a traveling reactor power monitoring system includes a drive control unit configured to rotate a motor and move a traveling probe in a guide tube by driving the motor, a torque sensor configured to measure a drive torque of the motor, and a drive torque monitoring unit that generates an alarm when the drive torque exceeds a predefined upper threshold, and bypasses generating the alarm at a predefined bypass time, the predefined bypass time starting at a time of starting driving the motor.

Additional objects and advantages of the disclosed embodiments will be set forth in part in the description which follows, and in part will be clear from the description, or may be learned by practice of the embodiments. The objects and advantages of the embodiments will be realized and attained by the elements and combinations particularly pointed out in the appended claims.

It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of the specification, illustrate embodiments and together with the description, serve to explain principles of the embodiments.

DESCRIPTION OF EMBODIMENTS

First Embodiment

Reference will now be made in detail to the present embodiments, examples of which are illustrated in the accompanying drawings. Wherever possible, the same reference numbers will be used throughout the drawings to refer to the same or like parts.

Figure 1:
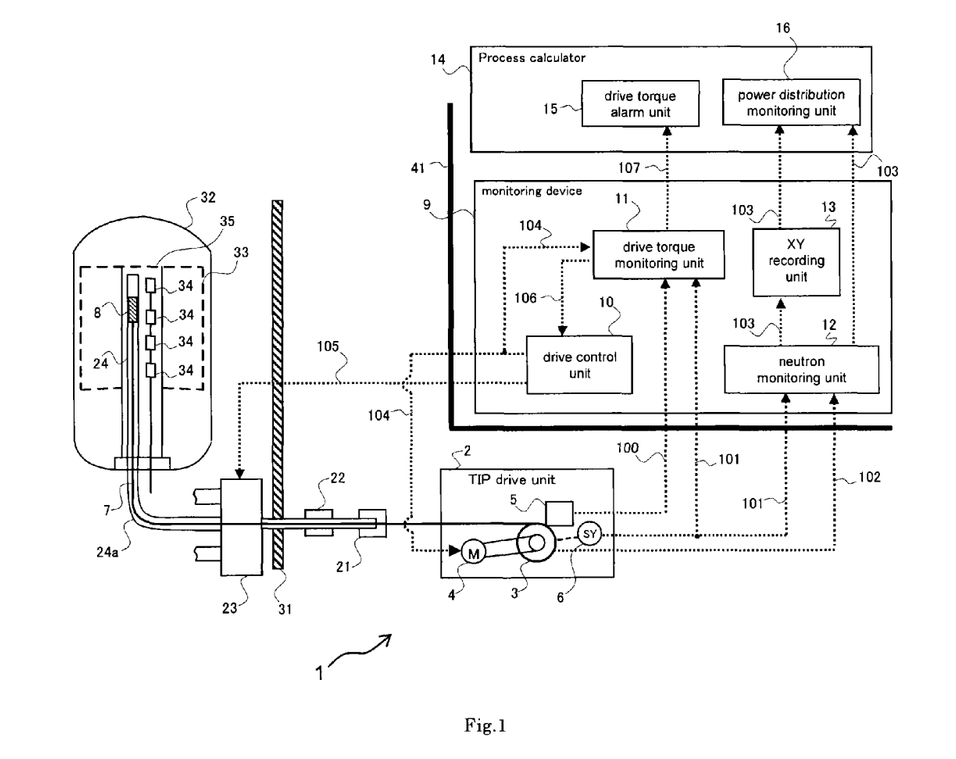
FIG. 1 is a block schematic diagram illustrating a TIP monitoring system according to a first embodiment.

FIG. 1 shows a general Boiled Water Reactor (BWR) power plant. At the BWR power plant, the traveling reactor power monitoring system is referred to as a Traversing In-core Probe (TIP) monitoring system 1. The TIP monitoring system 1 moves a traveling probe referred to as a TIP 8 to measure neutron flux in the reactor core.

Referring to FIG. 1, in a reactor container 31, a reactor pressure vessel 32 is stabilized. A reactor core 33 is a portion where the fission fuel is loaded in the reactor pressure vessel 32. A number of LPRMs 34 are provided in the reactor core 33. A number of guide tubes 24 are provided near the LPRMs 34 (FIG. 1 shows one of guide tubes 24.). Each guide tube 24 and LPRMs 34 account for a sensor assembly 35.

The TIP monitoring system 1 includes a TIP drive unit 2, a probe cable 7, the TIP 8 (travelling probe), a monitoring device 9, and a process calculator 14. The TIP drive unit 2 includes a storage reel 3, a motor 4, a torque sensor 5, and a probe position signal generator 6.

The monitoring device 9 and the process calculator 14 may be provided in a central monitoring room 41. The monitoring device 9 includes a drive control unit 10, a drive torque monitoring unit 11, a neutron monitoring unit 12, and a XY recording unit 13. The process calculator 14 includes a drive torque alarm unit 15 and a power distribution monitoring unit 17.

As shown in FIG. 1, the TIP drive unit 2 is provided outside of the reactor container 31. One edge of the probe cable 7 is connected to the TIP 8, and the storage reel 3 may store the probe cable 7. The motor 4 is provided to feed the probe cable 7 from the storage reel 3 and spool the probe cable 7 onto the storage reel 3 by rotating the storage reel 3. Between the storage reel 3 and the motor 4, gears and crutch may be provided.

The motor 4 can be connected to an inverter. The motor 4 receives supply power from the inverter to drive at a speed indicated by a drive command 104 from drive control unit 10.

Furthermore, the torque sensor 5 is provided to measure the drive torque that is a torque necessary for moving the TIP 8 and the probe cable 7 in the guide tubes 24 by the motor 4.

The probe position signal generator 6 is provided to monitor the length of spooling the probe cable 7 onto the storage reel 3. The probe position signal generator 6 may send the monitored cable length as the probe position signal 101 that indicates a probe position of the TIP 8.

Moreover, the drive control unit 10 is connected to the motor 4 and an indexing device 23 so as to send a drive command 104 and send an indexing command 105 respectively. Furthermore, the drive control unit 10 sends the drive command 104 not only to the motor 4 but also to the drive torque monitoring unit 11.

The drive torque monitoring unit 11 is connected to the torque sensor 5 and the probe position signal generator 6 to receive a drive torque signal 100 and receive a probe position signal 101 respectively.

The TIP 8 may send a probe output signal 102 that indicates the measured neutron flux through a signal transmitting line in the probe cable 7. The TIP 8 is connected to the neutron monitoring unit 12 to send the probe output signal 102 to the neutron monitoring unit 12 through the probe cable 7. Additionally, the neutron monitoring unit 12 is connected to the probe position signal generator 6 to receive the probe position signal 101 from the probe position signal generator 6.

A shielding vessel 21 is provided outside of the reactor container 31. The shielding vessel 21 may store and keep within it the TIP 8. A valve assembly 22 may be provided outside of the reactor container 31 and inside of the shielding vessel 21. An indexing device 23 is provided in the reactor container 31. The shielding vessel 21, the valve assembly 22, and the indexing device 23 are connected by a pipe to move the TIP 8 to the indexing device 23 from the shielding vessel 21 through the valve assembly 22.

The valve assembly 22 may include a gas valve purging gas in the guide tubes 24 and a cutting valve cutting the pipe at an emergency situation. Furthermore, the valve assembly 22 can close the pipe without neutron monitoring.

The guide tubes 24 are connected to the indexing device 23. Each guide tube 24 extends to under the reactor pressure vessel 32, and curves upwards. Furthermore, each guide tube 24 penetrates the bottom of the reactor pressure vessel 32, and extends vertically into the reactor core 33.

In the central monitoring room 41, the drive control unit 10 is connected to the drive torque monitoring unit 11 to send the drive command 104 and receive a stopping drive command 106. Furthermore, the drive torque monitoring unit 11 is connected to the drive torque alarm unit 15 to send a drive torque alarm signal 107. The neutron monitoring unit 12 is connected to the XY recording device 13 to send measured neutron information 103.

At first, measuring neutron flux is described as follows. Monitoring drive torque is described later.

Ordinary, the TIP 8 is stored in the shielding vessel 21. At the time of measurement of neutron flux, the drive control unit 10 sends the drive command 104 to the motor 4. The motor 4 feeds the probe cable 7 from the storage reel 3, and moves the TIP 8 to the indexing device 23 from the shielding vessel 21. Furthermore, the drive control unit 10 sends indexing command 105 to the indexing device 23. The indexing device 23 indexes the TIP 8 to a designated guide tube 24 to measure neutron flux indicated in the indexing command 105.

The drive control unit 10 further drives the motor 4 and inserts the TIP 8 into the designated guide tube 24. At each insert position, the drive control unit 10 moves TIP 8 at a predefined drive speed.

The TIP 8 measures neutron flux as reactor power at predefined points during moving in the guide tube 24, and sends the probe output signal 102 to the neutron monitoring unit 12 through the probe cable 7. The neutron monitoring unit 12 receives the probe position signal 101 from the probe position signal generator 6. The neutron monitoring unit 12 recognizes the measured flux level at each insert position by the probe output signal 102 and the probe position signal 101.

The neutron monitoring unit 12 sends the measured neutron flux at each insert position as the measured neutron flux information 103 to the XY recording unit 13. This measured neutron flux information 103 is also sent to the power distribution monitoring unit 16 via the XY recording unit 13 or directly from the neutron monitoring unit 12. The power distribution monitoring unit 16 calculates power distribution in the reactor core, and calculates the value for calibrating the LPRMs 34.

After moving the TIP 8 to a predefined end point of the guide tube 24, the drive control unit 10 reverses motor 4 and spools the probe cable 7 onto the storage reel 3, and moves the TIP 8 back to the indexing device 23. If it is necessary to measure neutron flux in another guide tube 24, the drive control unit 10 sends the indexing command 105 to the indexing device 23. And the indexing device 23 indexes the TIP 8 to the other guide tube 24, and the drive control unit 10 moves the TIP 8 into the other guide tube 24.

After moving the TIP 8 in all designated guide tubes 24, the drive control unit 10 spools the probe cable 7 onto the storage reel 3 and stores the TIP 8 in the shielding vessel 21.

Next, a method for monitoring drive torque is described. The drive torque monitoring unit 11 receives the drive torque signal 100 from the torque sensor 5, and receives the probe position signal 101 from the probe position signal generator 6. The drive torque monitoring unit 11 compares the drive torque with a predefined upper threshold at each probe position.

If the drive torque exceeds the upper threshold, the drive torque monitoring unit 11 sends a drive torque alarm signal 107 to the drive torque alarm unit 15. The drive torque alarm unit 15 generates an alarm by the drive torque alarm signal 107. Additionally, the drive torque monitoring unit 11 may add the probe position into the drive torque alarm signal 107. In this case, the drive torque alarm unit 15 can show the probe position where the drive torque exceeds the upper threshold at a monitor.

Furthermore, if the drive torque exceeds the upper threshold, the drive torque monitoring unit 11 may send a stopping drive signal 106 to the drive control unit 10. The drive control unit 10 then stops driving the TIP 8 by the stopping drive signal 106.

Figure 2:
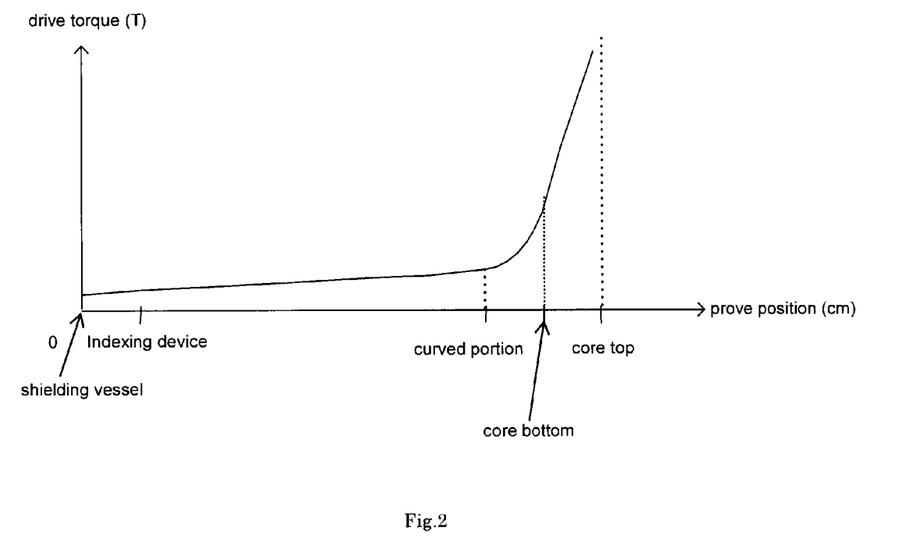
FIG. 2 is a graphic representation illustrating the drive torque relative to the probe position at a normal state.

The shape and the length of guide tubes 24 may be different from each other. Furthermore, according to the insert distance of the TIP 8 into the guide tube 24, the contact area of the probe cable 7 and the guide tube 24 may increase, and as shown in FIG. 2 the drive torque that is a torque necessary for moving the TIP 8 and the probe cable in the guide tube 24 may then increase. Furthermore, at the curved portion 24a (FIG. 1) of the guide tube 24 under the reactor pressure vessel 32, the drive torque increases more rapidly than the vertical portion per unit distance Therefore, the upper threshold for generating the alarm may be set by adding a predefined value to the normal drive torque at each probe point.

Here, at starting the measuring neutron flux operation, at a starting driving situation that the drive control unit 10 starts driving the motor 4 by sending the drive command 104, the drive torque at starting driving may be larger than the drive torque in a driving stably state. This is because the drive torque increases due to inrush current at starting driving the motor 4, and because a larger drive torque is needed to move the TIP 8 against static frictional force at starting driving.

As a result, at starting driving, there is a possibility that the drive torque exceeds the upper threshold despite having an acceptable friction condition, and the drive torque monitoring unit 11 may mistakenly send the drive torque alarm signal 107 to the drive torque alarm unit 15 at the starting driving time.

Therefore, according to this embodiment, the drive torque monitoring unit 11 receives the drive command 104, and stops comparing the drive torque and the upper threshold during a predefined time after receiving the drive command 104 indicating starting driving the motor 4. After the predefined time, the drive torque monitoring unit 11 starts comparing the drive torque and the upper threshold. This is because the drive torque after the predefined time settles down to more accurate values in a stable driving state.

Figure 3:
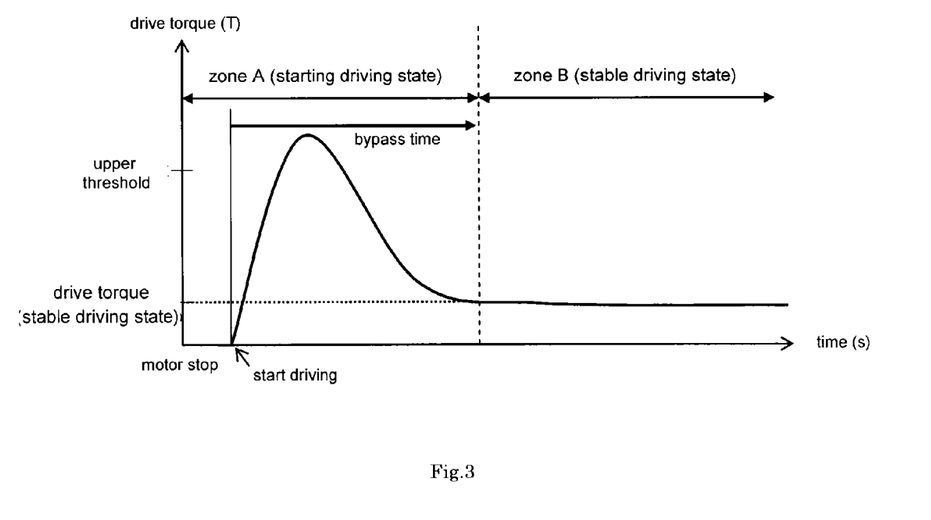
FIG. 3 is a graphic representation illustrating the drive torque change from a starting driving state to a stable driving state.

One of the methods for determining the bypass time is described as follows. At a plant check up, or at a time of installing the motor 4, the drive control unit 10 drives the motor 4 on a trial basis, and the torque sensor 6 measures the drive torque from the starting driving state to the stable driving state. As shown in FIG. 3, zone A is a starting driving state when the motor 4 starts driving, and zone B is a stable driving state when the motor 4 drives stably. By monitoring the drive torque, a time lapse after starting driving the motor 4 and before the stable driving state (zone B) can be set as the bypass time. That is, the bypass time can be set as the time of zone A.

Figure 4:
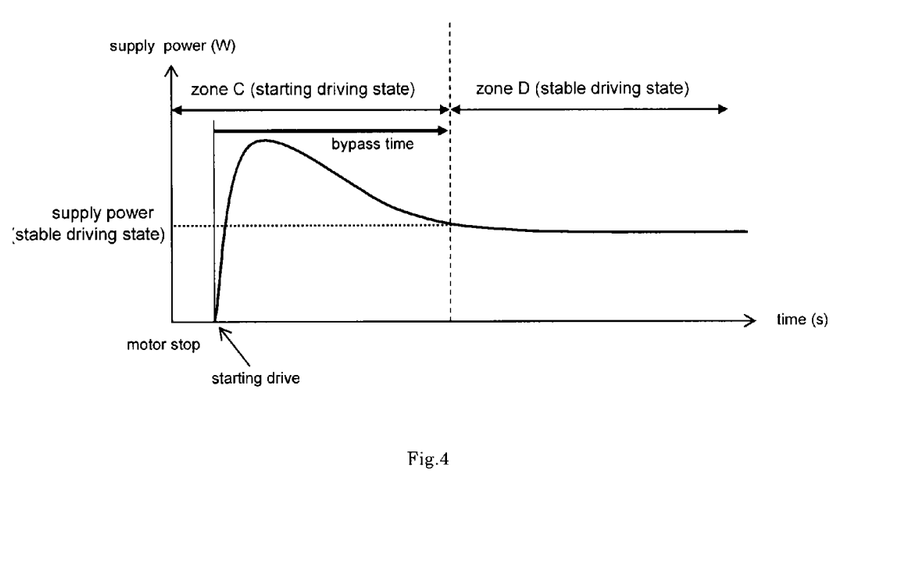
FIG. 4 is a graphic representation illustrating the supply power change from the starting driving state to the stable driving state.

Another method for determining the bypass time is described as follows. By monitoring the supply of power to the motor 4, the time period from the inrush incurrent to a rated incurrent can be set as the bypass time. As shown in FIG. 4, zone C is in the starting driving state, and zone D is in a stable driving state. By monitoring the supply power, a time lapse after starting driving the motor 4 and before the stable driving state (zone D) can be set as the bypass time.

With the above described embodiment, issuing an improper alarm is prevented by stopping comparing the drive torque and the threshold during a bypass time. Issuing an improper alarm can also prevented by stopping sending the drive torque alarm signal 107 during the bypass time. Furthermore, issuing an improper alarm can also be prevented by assigning an ordinary value to the drive torque during the bypass time.

This embodiment may be modified as follows. When the drive torque exceeds the upper threshold, the drive control unit 10 stops moving the TIP 8 by the stopping drive command 106. In this case, the drive control unit 10 reverses the motor 4 and retrieves the TIP 8 by a predefined length, and inserts the TIP 8 again. By doing this re-inserting operation, any twist of the cable 7 and the way of the TIP 8 may be improved, and the flux measuring operation may be continued. During this re-inserting operation, by stopping comparing the drive torque and the upper threshold for a time until a stable driving state is achieved, issuing an improper alarm is prevented.

Furthermore, the drive control unit 10 may memorize the probe position where the drive torque exceeds the upper threshold. In this case, at a next time of inserting the TIP 8, the drive control unit 10 drives the motor 4 at a predefined slower speed at this memorized probe position. As the result, the drive control unit 10 is able to continue driving at this probe position.

Figure 5:
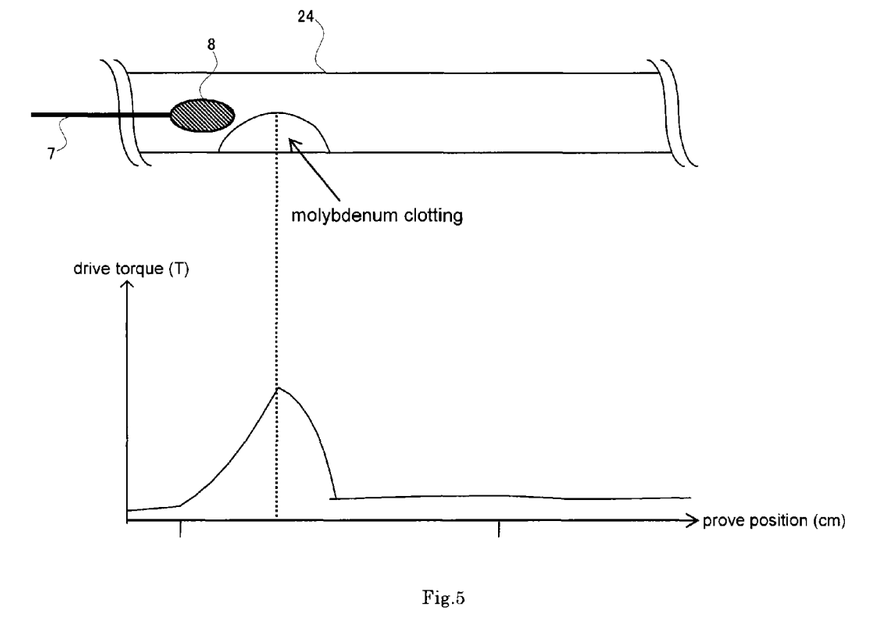
FIG. 5 is a graphic representation illustrating the drive torque change at a molybdenum clotting.

The drive torque may increase by lubricant, such as molybdenum, clotting. As shown in FIG. 5, for example, molybdenum can be coated as a lubricant or an inside of the guide tubes 24. This molybdenum may be peeled from an inside wall of the guide tubes 24, and may be gathered partially as a molybdenum clotting. When the TIP 8 moves at this molybdenum clotting, the drive torque may increase temporary.

At this molybdenum clotting, when the drive torque exceeds the threshold, the drive control unit 10 stops the TIP 8. The drive control unit 10 determines this stop position by the probe position signal 101, and drives the motor 4 at a slower speed at this stop position. Furthermore, the drive control unit 10 moves the TIP 8 back and forth at this stop position. In this case, this molybdenum clotting may be broken and homogenized by shuttling the TIP 8. In this operation, the alarm is bypassed and the motor 4 is driven at a slower speed.

Additionally, this embodiment may be modified as follows. The drive control unit 10 may drive the motor 4 at a slower speed at a portion from the core bottom to the core top to measure the neutron flux. The drive control unit 10 can also then drive the motor 4 at a higher speed at the portion located blow the core bottom, because measuring neutron flux is not needed at this portion. And generally, motor output: P, motor rotating speed: ω and motor torque: T have a relation described by below formula (1).

$$P \text{ [W]} = \omega \text{ [rad/s]} \times T \text{ [N·m]} \qquad (1)$$

As shown in formula (1), in the condition that supply of power and motor output P is constant, the drive torque T1 at a higher speed driving is less than the drive torque T2 at a lower speed driving. Therefore, to monitor the drive torque T1 and T2 by using one upper threshold, the drive torque monitoring unit 11 multiplies the drive torque T1 by the predefined bias. This bias is set to consider the end point of the drive torque T1 and the start point of the drive torque T2 are equal, by driving the motor 4 from a higher speed to a lower speed under constant motor output.

The torque sensor 5 may monitor the drive torque by using output power P that an inverter supplies to the motor. In this case, by above formula (1), the output power P1 at a higher speed driving is larger than the output power P2 at a slower speed driving. To monitor the output power P as one change, the drive torque monitoring unit 11 divides the output power P1 by the bias, and considers the output power P1 and P1/bias.

At switching between slower and higher speeds, the drive torque may change due to the above conversion. Furthermore, there is a possibility that the drive torque may change rapidly. Therefore, by bypassing the alarm at a switching time such as for 3 seconds, issuing an alarm due to the switching is prevented.

In this embodiment, it is possible to prevent issuing an alarm by stopping generating the alarm for a predefined time after starting driving the motor 4.

Second Embodiment

Figure 6:
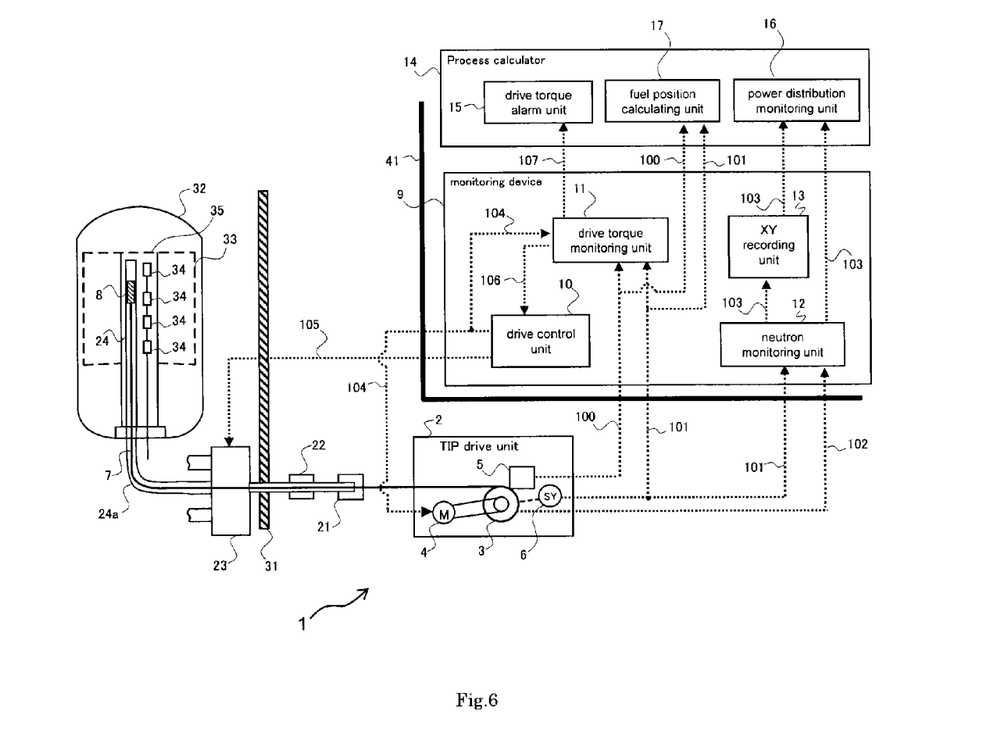
FIG. 6 is a block schematic diagram illustrating a TIP monitoring system according to a second embodiment.

This embodiment differs from the first embodiment in that, as shown in FIG. 6, the process calculator 14 further includes a fuel position calculating unit 17. The fuel position calculating unit 17 is connected to the probe position signal generator 6 to receive the probe position signal 101, and is connected to the torque sensor 5 to receive the drive torque signal 100.

The fuel position calculating unit 17 receives the probe position signal 101 and the drive torque signal 100, and calculates the differential value of the drive torque. As shown FIG. 2, the drive torque increases exponentially at the curved portion 24a, and the differential value of the drive torque at the curved portion 24a is larger than at other portions.

Thus, the fuel position calculating unit 17 compares the calculated differential value and a predefined threshold, and determines the position that the differential value exceeds the predefined value as the curved portion 24a. Here, the length between the curved portion 24a and the core bottom is definite. Therefore, the fuel position calculating unit 17 determines the position of the core bottom by adding a predefined value to the curved portion 24a. Furthermore, the fuel position calculating unit 17 determines the core top by adding a predefined value to the core bottom.

In addition, the fuel position calculating unit 17 may determine the end insert point of the guide tube 24 when the drive torque increases by the TIP 8 reaching the end point of the guide tube 24. Furthermore, the fuel position calculating unit 17 determines a position a predefined length below (such as 12 m) the end insert point as the core bottom.

By calculating a moving average of the drive torque, the fuel position calculating unit 17 can compare this moving average and the predefined value. In this case, a missed determination due to partial torque increasing by the molybdenum clotting is prevented. Furthermore, the fuel position calculating unit 17 may monitor the differential value only at a predefined range.

In this embodiment, it is possible to determine the position of the core bottom and top by monitoring the differential value or the moving average of the drive torque.

The above described embodiments can be modified in various different ways such as noted below. At a Pressurized Water Reactor (PWR) power plant, fixed neutron sensors are provided at an outer periphery of the reactor as substitute for LPRMs 34. Thus, the above mentioned TIP monitoring system 1 can be applied to the PWR power plant as a traveling reactor power monitoring system.

Furthermore, at some PWR power plants, guide tubes 24 penetrate an upper portion of the reactor pressure vessel, and the traveling probe TIP 8 moves to the core bottom from the core top. In addition, the traveling power monitoring system can connect a gamma thermo meter as the traveling probe. This gamma thermo meter can measure gamma rays in the reactor core during moving. In this case, the traveling power monitoring system can measure gamma rays as reactor power.

Obviously, numerous modifications and variations of the embodiment are possible in light of the above teachings. It is therefore to be understood that within the scope of the appended claims, the embodiments may be practiced otherwise than as specifically described herein.

What is claimed is:

1. A traveling reactor power monitoring system for moving a traveling probe connected to a probe cable in a guide tube, comprising:
    a drive control processor configured to drive the motor and move the traveling probe in the guide tube by driving a motor;
    a torque sensor configured to measure a drive torque of the motor; and
    a drive torque monitoring processor configured to generate an alarm when the measured drive torque exceeds a predefined upper threshold, and configured to bypass generating the alarm for a predefined bypass time, the predefined bypass time starting at a time of starting driving the motor,
    wherein:
    the drive control processor is configured to drive the motor at a higher speed when the traveling probe is at a first area in the guide tube and at a lower speed when the traveling probe is at a second area in the guide tube, and the drive torque monitoring processor configured to bypass generating the alarm during switching between the higher speed driving and lower speed driving.

2. The traveling reactor power monitoring system of claim 1, wherein:
the drive torque monitoring processor is configured to stop driving the motor when the drive torque exceeds the predefined upper threshold, and to bypass generating the alarm for the predefined bypass time when the chive control processor restarts driving the motor.

3. The traveling reactor power monitoring system of claim 1, wherein:
the drive control processor is configured to drive the motor at the lower speed at a probe position that the chive torque is measured to exceed the upper threshold.

4. The traveling reactor power monitoring system of claim 1, wherein:
the drive control processor is configured to store a position of the probe when the measured drive torque of the motor is measured as exceeding the predefined upper threshold; and
the drive control processor is configured to move the motor alternately in forward and reverse at the stored position of the probe that the measured drive torque exceeds the upper threshold.

* * * * *